Aug. 1, 1961 P. H. TANNER ET AL 2,994,129
HIGH SPEED DENTAL HANDPIECE
Filed May 8, 1956 2 Sheets-Sheet 1

INVENTORS
PAUL H. TANNER
OSCAR P. NAGEL
BY W R Maltby
Z S. Flax
ATTORNEYS

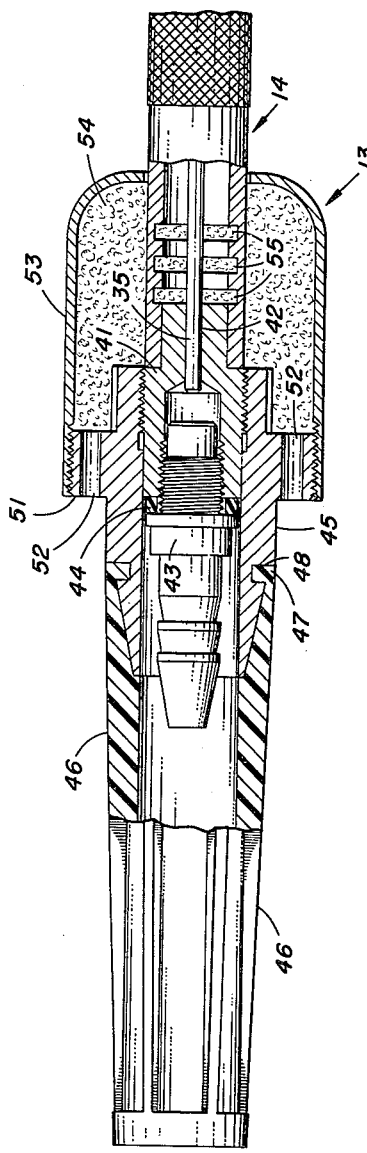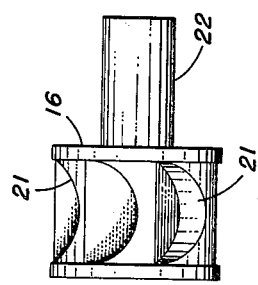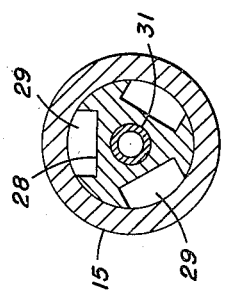

United States Patent Office 2,994,129
Patented Aug. 1, 1961

2,994,129
HIGH SPEED DENTAL HANDPIECE
Paul H. Tanner, Washington, D.C., and Oscar P. Nagel, Rockville, Md.
Filed May 8, 1956, Ser. No. 583,596
5 Claims. (Cl. 32—27)
(Granted under Title 35, U.S. Code (1952), sec. 266)

The invention described herein may be manufactured and used by or for the Government of the United States of America for governmental purposes without the payment of any royalties thereon or therefore.

The present invention relates to a high-speed dental handpiece and more particularly to a high-speed dental handpiece in which the motive power means, driven by a compressed fluid, is located in the head of the device.

Conventional prior art dental handpieces are powered by an electric motor or dental engine which is mounted upon an engine arm located ear the dental chair. A series of belts, pulleys, and gears connects the engine to the handpiece so that the cutting tool can be rotated, and these belts and pulleys are mounted on a plurality of arms having flexible joints so that the dental handpiece can be placed in the desired positions. The conventional dental handpiece referred to above is seriously limited in its speed of operation; speeds of from 6,000 to 10,000 r.p.m. are considered to be maximum.

The present invention is in the nature of a high-speed fluid-driven dental handpiece in which the above disadvantages of the prior art are remedied. It consists of a dental handpiece in which the motive power is supplied by means of a rotor or turbine mounted in the head of the handpiece and designed to be operated by compressed fluid. This rotor or turbine is capable of speeds of from 100,000 r.p.m. to 200,000 r.p.m., and the dental engine with all its gears, pulleys, and belts is eliminated, as a flexible tubing can be connected directly from a source of compressed fluid to the handpiece.

The prior art also shows dental tools driven by a compressed fluid in which the rotor or turbine is located at the end of the handpiece remote from the head and cutting tool. The speed of these prior art devices is also limited to approximately one-fourth to one-eighth the speed of the present device, since a long shaft is necessary to connect the rotor with the cutting tool which will vibrate or whip when very high speeds are reached.

The present invention provides a rotor or turbine located in the head of the dental handpiece so that the tool is cooled as the compressed fluid expands while driving the rotor or turbine. Locating the turbine or rotor in the head of the device also provides for increased speed of operation as the driving shaft of prior art devices is eliminated, the cutting tool of the present invention being mounted within the rotor itself. The present invention can take the form of a contra-angle head, thereby facilitating the performance of cutting operations on the teeth located in the back of the oral cavity.

An object of the present invention is the provision of a high-speed dental handpiece which is operated by a compressed fluid.

Another object is to provide a high-speed dental handpiece which is operative for performing dental work with a minimum of pressure upon the part of the operator.

A further object is the provision of a high-speed dental handpiece in which the tool or burr is cooled during operation by the expansion of the compressed fluid as it is directed onto the turbine or rotor.

Still another object of the invention is the provision of a high-speed pneumatic dental handpiece in which the motive power means, driven by a compressed fluid, is located in the head of the device.

A further object is to provide a novel means, which is simple and very convenient, for fastening the burr or cutting tool in the handpiece.

Another object of the present invention is the provision of a high-speed pneumatic dental handpiece in which the axis of the cutting tool and the axis of the handle of the dental piece are disposed at an angle to each other and in which means are provided to vary this angle.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

FIGURE 4 is a cross sectional view of the head assembly taken on line 4—4 looking in the direction of the arrows, showing the tube holder and discharge tube.

FIGURE 5 is an enlarged sectional view of the rear of the dental drill piece shown in FIGURE 1.

FIGURE 6 is a side elevational view of a form of rotor to be used with this device.

Figure 1:
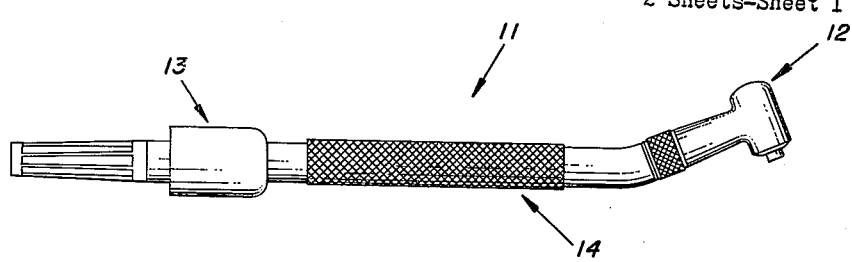
FIGURE 1 is a side elevational view showing a preferred form of the invention.
Figure 2:
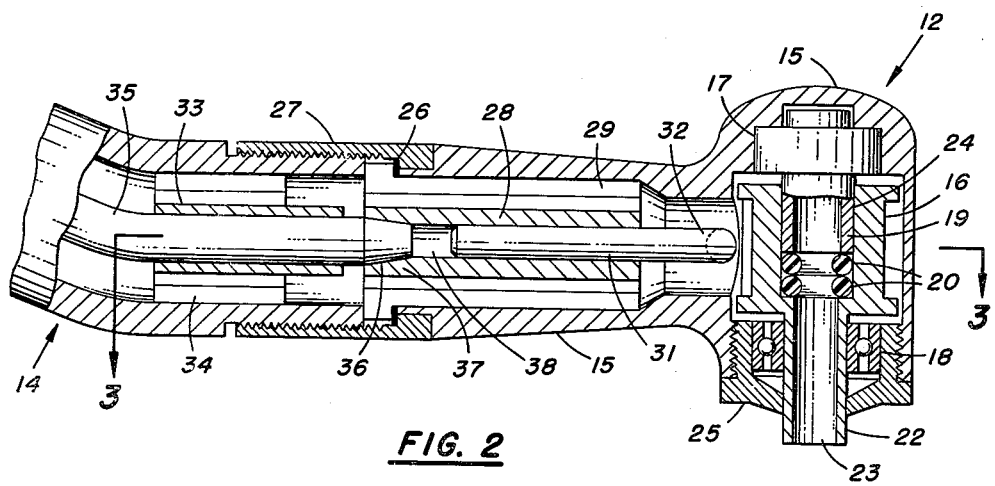
FIGURE 2 is an enlarged sectional view of the head assembly of the dental drill piece shown in FIGURE 1.

Referring now to the drawings, wherein like reference characters designate like or corresponding parts throughout the several views, there is shown in FIGURE 1 (which illustrates a preferred embodiment) a high-speed dental handpiece generally designated by the numeral 11, which has a head assembly portion 12, a rear or exhaust and supply portion 13, and a knurled handle assembly 14. Referring now to FIGURE 2, there is shown a rotor casing 15 made of any suitable material, such as stainless steel, which houses the rotor assembly comprising a rotor 16 made of any suitable metal, preferably brass or copper, anti-friction roller bearings 17 and 18, burr holder 19 and O-rings 20. The latter may be of a suitable elastic material such as neoprene or rubber.

Figure 3:
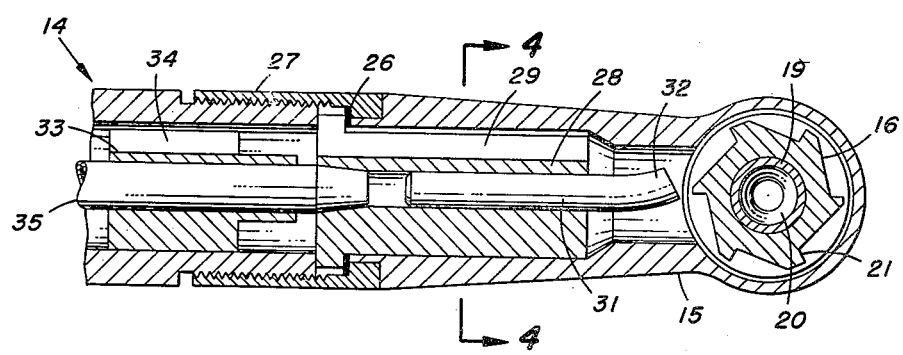
FIGURE 3 is a section of the head assembly taken along line 3—3 of FIGURE 2 looking in the direction of the arrows.

The rotor 16 has a main body portion in which semi-circular indentations 21 are cut which serve as buckets for rotor 16, and, as can be seen by reference to FIGURE 3 and FIGURE 6, said indentations are not evenly spaced about the periphery of the rotor, but are so located that the lands between the indentations are of varying dimensions over one half the periphery of the rotor. In order for the rotor to be balanced, the same spacing is maintained over the other half. Such an arrangement will partially alleviate the high-pitch scream normally associated with a high-speed turbine of this type by producing sounds of different frequency or pitch. The rotor also has a reduced portion 22 upon which the anti-friction bearing 18 is pressed, said reduced portion also contains axial bore 23 adapted to receive the shaft of a standard dental burr or other cutting tool. The main body portion of the rotor 16 contains axial bore 24 adapted to receive O-rings 20 and burr holder 19; the bearing 17 is then pressed upon the external portion of the burr holder. Although the rotor 16 is shown in its preferred form in FIGURES 3 and 6, it is to be understood that said rotor may take other forms such as a conventional turbine with blades extending from the periphery thereof or one in which the indentations or vanes 21 may be of different configuration or shape. The particular rotor illustrated is preferred because, as pointed out above, it helps to alleviate the high pitched scream and because it is relatively simple and easy to manufacture.

It is to be noted that axial bore 23, O-rings 20, and burr holder 19 of such a size as to receive conventional dental tools; therefore, there is no necessity for the purchaser of the handpiece to purchase another set of dental tools. This entire assembly is manufactured as a unit. The assembly is then placed in the rotor casing which is properly formed to hold the rotor assembly so that the outside race of bearing 17 is firmly held, and the rotor holder cap 25, the internal bore of which is adapted to firmly hold the outer race of bearing 18, is screwed into place.

The rotor holder 15 is detachably mounted on the handle assembly 14 by means of washer 26 and lock nut 27, which is free to rotate upon the rotor casing. Within the rotor holder 15 (see FIGURE 4) there is fitted a tube holder 28 with slots 29 for the purpose of holding fluid discharge tube 31, which has a nozzle portion 32 for directing the compressed fluid against the indentations or vanes of the rotor. Within the handle assembly 14, there is fitted a tube holder 33, with slots 34—similar to the tube holder 28 which is placed in the rotor holder 15—adapted to hold fluid supply tube 35, which extends through the handle assembly 14 and terminates in the fluid supply and exhaust portion 13 as shown in FIGURE 5. The air supply tube 35 extends beyond tube holder 33 for a short distance; this extension 36 is swaged and fits into beveled portion 37 of tube holder 28 to provide an air tight seal between the tube holder and the extension 36. This leaves a short space 38 between the fluid discharge tube 31 and the air supply tube 35. The fluid supply and discharge tubes 35 and 31 may be held in place in tube holders 33 and 28 respectively by any suitable means such as silver solder.

It can readily be appreciated, by reference to FIGURE 1, that the head assembly 12 can be roated with respect to the handle assembly 14 by backing off the lock nut 27, turning the head, and again tightening the nut. An air tight seal is maintained between the swaged extension 36 of the air supply tube 35 and the beveled portion 37 of tube holder 28 regardless of the position of the head assembly with respect to the handle assembly as swaged extension 36 merely rotates within beveled portion 37 in tube holder 28. Turning the head 12 with respect to the handle assembly 14 allows the operator to position the cutting tool or burr in any position he desires with respect to the handle assembly. This adjustment can be very advantageous when the tool is used in dental operations performed on teeth in the back of the oral cavity.

Referring now to FIGURE 5, there is shown a hose connector 41 fitted into the end of handle assembly 14, with a small axial bore 42 in one end adapted to receive the end of air supply tube 35, which is affixed to the hose connector by any suitable means, such as silver solder. The other end of the hose connector 41 is provided with an enlarged bore which receives hose assembly 43 of conventional design adapted to receive a conventional fluid supply tube, not shown. A rubber or plastic washer 44 provides an air tight seal between the hose assembly 43 and the hose connector 41.

Surrounding the hose connector 41 and engaged thereto is a hose guard and muffler holder 45 adapted to receive a hose guard 46 which may be made of a suitable pliant material such as plastic or rubber, said hose guard being fastened to the hose guard holder and muffler holder 45 by means of flange 47 on the hose guard and recess 48 in the hose guard holder. The hose guard and muffler holder 45 has an enlarged annular portion 51 with a plurality of holes or slots 52 adapted to receive a muffler housing 53 which contains a muffler material 54 composed of a loosely packed fiber, such as fiber glass or steel wool. The handle assembly 14 contains a series of holes or slots 55 which provides ports for the exhaust air between the handle assembly 12 and the muffler material 54.

*Operation of the device*

In operation, the operator merely has to insert the shaft of a conventional dental tool or burr, not shown, through the axial bore 23 in the rotor and into the burr holder 19. In so doing the O-rings 20 are compressed, thereby firmly gripping the shaft to hold it firmly in burr holder 19 for rotation therewith.

A hose from a supply of compressed fluid, not shown, for example, an air compressor or a bottled fluid supply pressure, is inserted through the hose guard 46 and affixed to the hose assembly 43; the compressed fluid flow is controlled by means of a suitable valve means, not shown, for example, a solenoid actuated valve which can be operated by the operator's foot. When this valve is opened compressed fluid flows through the hose, through hose assembly 43, hose connector 41, fluid supply tube 35, space 38, fluid discharge tube 31, and is directed by the nozzle portion 32 against the vanes or indentations 21 of the rotor 16, thereby driving the rotor at high speeds. As seen by reference to FIGURE 1, the cutting tool passes through the axis of the rotor and is firmly held in position by means of O-ring seals 20, thus the cutting tool is revolved at high speeds. A fluid pressure of 60 p.s.i. has been found to be advantageous; however, either a higher or lower pressure may be used as desired.

The fluid is exhausted from the rotor holder through the slots 29 and 34 respectively in the tube holders 28 and 33 and then passes through the handle assembly 14, slots 55, and is exhausted to the atmosphere through the muffler material 54 by means of holes or slots 52 in the muffler holder 45. The muffler material 54 reduces the high-pitched scream normally associated with high-speed turbines and makes the handpiece more desirable for use.

During operation the rotor assembly and cutting tool is cooled appreciably by the compressed fluid as it expands from the nozzle 32, thus the heating of the cutting tool to temperatures where tooth structure may be damaged or the patient may become uncomfortable is partially prevented.

The high speed of operation also permits the operator to use very little pressure compared to conventional devices; it has been estimated that 1 to 2 ozs. of pressure on the present tool will result in cutting speeds comparable to 1 to 2 lbs. of pressure on tools operated by conventional drive methods. The high speed of operation combined with a minimum of pressure permits the use of a brush stroke on the part of the operator, thus enabling him to perform much more delicate work than with prior art devices.

It should also be pointed out that if the operator applies a great deal of pressure to the tooth, the tool will very quickly come to a complete stop despite its very high speed of operation because the rotor has a very small mass and diameter, thus a small rotational inertia or angular momentum. This stopping action is very advantageous as it will prevent damage to tooth structure from overheating and excessive vibration. When the operator wishes to change the cutting tool, all that he has to do is pull the cutting tool from the burr holder 19, thus withdrawing the tool shaft from the O-rings 20, and insert another in its place. It is readily apparent that such an arrangement is very simple and convenient in its operation and superior to conventional chuck means. However, conventional chuck means for holding the burr, which are common in the prior art, may be used if desired.

Thus it can be appreciated that a dental handpiece has been provided, which has a high speed of operation, which can be operated with a minimum of pressure, and which is cooled during operation by means of the expanding fluid. There is also provided a very simple and convenient means for holding the burr or cutting tool and means for rotating the head of the device in relation to the handle assembly.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

What is claimed is:

1. A dental handpiece comprising, in combination, a handle assembly, a fluid driven rotor having a bore extending therethrough, said rotor having a pair of end faces and being mounted within a casing in one end of said handle assembly, said rotor having a reduced portion extending from one end face thereof, said reduced portion extending through an opening in said casing and having a bore therein, a burr holder extending from the other end face of said rotor, said burr holder having a bore therein coaxial with the bore in said reduced portion, means in said rotor for retaining a burr, bearings fitted over said reduced portion of said rotor and over said burr holder, whereby a dental tool is adapted to be frictionally received within the bores in said reduced portion and said burr holder so that the tool is supported at one end thereof by the burr holders and at an intermediate portion adjacent the point of emergence of the tool from the rotor by the reduced portion.

2. A dental handpiece comprising, in combination, a handle assembly including a casing, a fluid driven rotor having a bore extending therethrough, said rotor being mounted within the casing in one end of the handle assembly, a reduced end portion on said rotor having a bore therein, a burr holder comprising a sleeve press fit within the bore in said rotor, said burr holder having a bore therein coaxial with and the same diameter as the bore in said reduced end portion, bearings press fit over said reduced end portion and said burr holder whereby a dental burr is adapted to be frictionally received within the bores in said reduced end portion and said burr holder to support the burr at least at an end thereof and an intermediate portion.

3. A dental handpiece according to claim 2 and further including resilient retaining elements mounted within the bore in the rotor.

4. A dental handpiece comprising, in combination, a handle assembly, a rotor having a bore extending therethrough, said rotor having a pair of end faces and being mounted within a casing in one end of said handle assembly, said casing adapted for insertion into a patient's oral cavity, said rotor having a reduced portion extending from one end face thereof, said reduced portion extending through an opening in said casing and having a bore therein, burr holder means extending from the other end face of said rotor, said burr holder means having a bore therein coaxial with the bore in said reduced portion, bearings fitted over said reduced portion of said rotor and over said last named means and means within the rotor assembly for gripping a dental tool, the dental tool adapted to be supported adjacent one end by said burr holder means extending from the other end face of the rotor and at an intermediate portion adjacent the point of emergence of the tool from the rotor by the reduced portion so that the dental tool is firmly supported in the rotor.

5. A dental handpiece comprising, in combination a handle assembly, a casing on one end of said handle assembly, said casing adapted for insertion into a patient's oral cavity, a rotor mounted within the casing, said rotor having means on the outer surface forming turbine blades, a fluid supply and exhaust section attached to the other end of the handle assembly, means within the handle assembly for conducting fluid to and from said rotor, said rotor having a reduced portion extending from one end face thereof, said reduced portion extending through an opening in said casing and having a bore therein, burr holder means extending from the other end face of said rotor, said burr holder means having a bore therein coaxial with the bore in said reduced portion, bearings fitted over said reduced portion of said rotor and over said last named means and means within the rotor assembly for gripping a dental tool, the dental tool adapted to be supported adjacent one end by said burr holder means extending from the other end face of the rotor and at an intermediate portion adjacent the point of emergence of the tool from the rotor by the reduced portion so that the dental tool is firmly supported in the rotor.

References Cited in the file of this patent

UNITED STATES PATENTS

| 1,815,611 | Brown | July 21, 1931 |
| 2,157,115 | Cornell | May 9, 1939 |
| 2,180,993 | Monnier | Nov. 21, 1939 |
| 2,283,314 | Ckola | May 19, 1942 |
| 2,664,632 | Norlen | Jan. 5, 1954 |

FOREIGN PATENTS

| 914,416 | France | June 17, 1946 |
| 163,217 | Austria | June 10, 1949 |